United States Patent [19]

Acenbrack

[11] Patent Number: 5,044,686
[45] Date of Patent: Sep. 3, 1991

[54] RETRACTABLE HORIZONTAL CONVEYANCE SHADE APPARATUS

[76] Inventor: Donald F. Acenbrack, 1926 Sever Dr., Clearwater, Fla. 34624

[21] Appl. No.: 367,746
[22] Filed: Jun. 19, 1989
[51] Int. Cl.$^5$ .............................................. B60J 3/00
[52] U.S. Cl. ................................. 296/97.7; 296/97.8; 296/97.9; 160/32; 160/84.1; 160/370.2
[58] Field of Search ................... 296/97.1, 97.7, 97.8, 296/97.9; 160/DIG. 3, 32, 33, 35, 84.1, 370.23

[56] References Cited

U.S. PATENT DOCUMENTS

| | | | |
|---|---|---|---|
| 2,234,804 | 3/1941 | Murray | 160/370.2 X |
| 3,003,812 | 10/1961 | Haugland | 296/97.7 |
| 4,332,414 | 6/1982 | Surtin | 296/97.7 |
| 4,647,102 | 3/1987 | Ebrahimzadeh | 296/97.8 X |
| 4,758,042 | 7/1988 | Liu | 296/97.7 |
| 4,775,180 | 10/1988 | Phillips | 296/97.7 X |
| 4,825,929 | 5/1989 | Haines | 160/84.1 |
| 4,869,542 | 9/1989 | Lin | 296/97.8 |
| 4,886,104 | 12/1989 | Eldridge, Jr. | 296/97.7 X |
| 4,901,419 | 2/1990 | Voss | 160/84.1 X |

FOREIGN PATENT DOCUMENTS

| | | | |
|---|---|---|---|
| 2621645 | 4/1989 | France | 296/97.8 |
| 128827 | 6/1987 | Japan | 296/97.8 |

Primary Examiner—Margaret A. Focarino
Assistant Examiner—Andrew C. Pike
Attorney, Agent, or Firm—Joseph C. Mason, Jr.; Ronald E. Smith

[57] ABSTRACT

An improved shade apparatus for the interior of an outdoor conveyance, such as an automobile, boat, airplane, travel trailer, or van comprises a horizontally pleated shade and a mounting and fastening apparatus. The mounting and fastening apparatus facilitates storage of the folded shade and then facilitates positioning and fastening of the shade when opened to its operative position. In an alternative embodiment, the shade may be mounted, stored, and opened from a recessed channel along the dashboard or other horizontal surface near the bottom of the windshield of a conveyance.

8 Claims, 7 Drawing Sheets

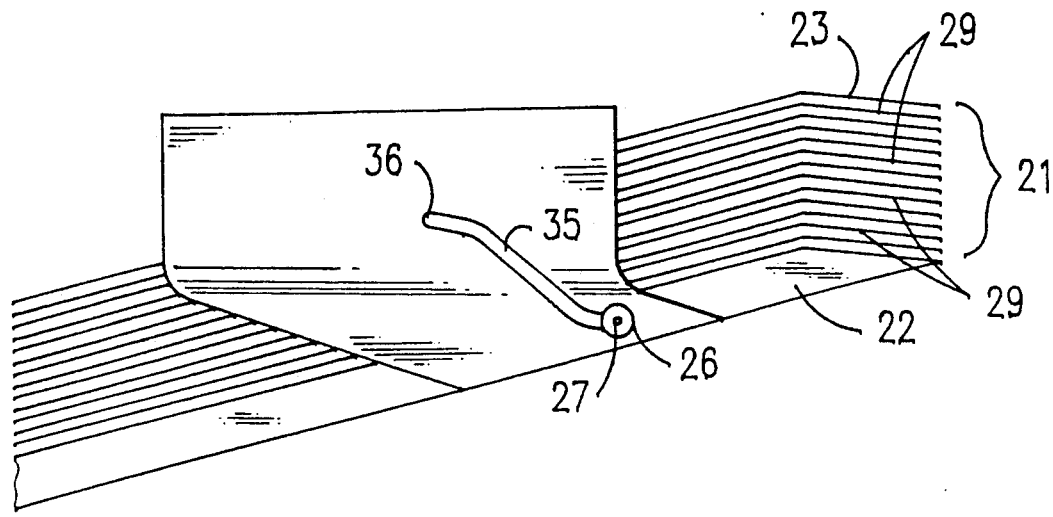
Fig_2A
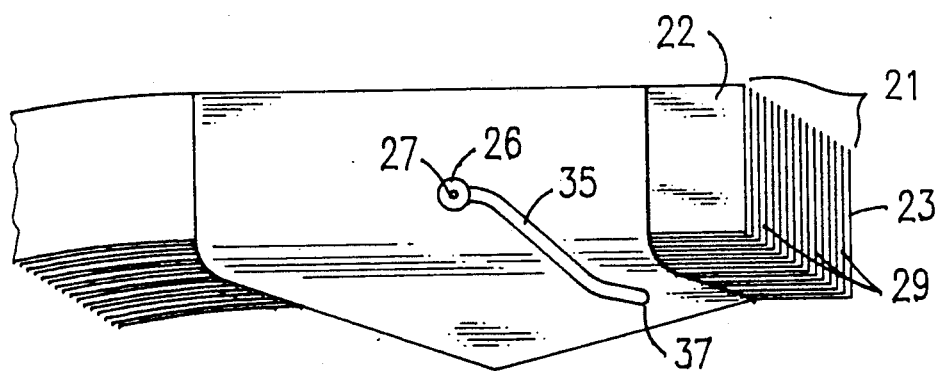
Fig_2

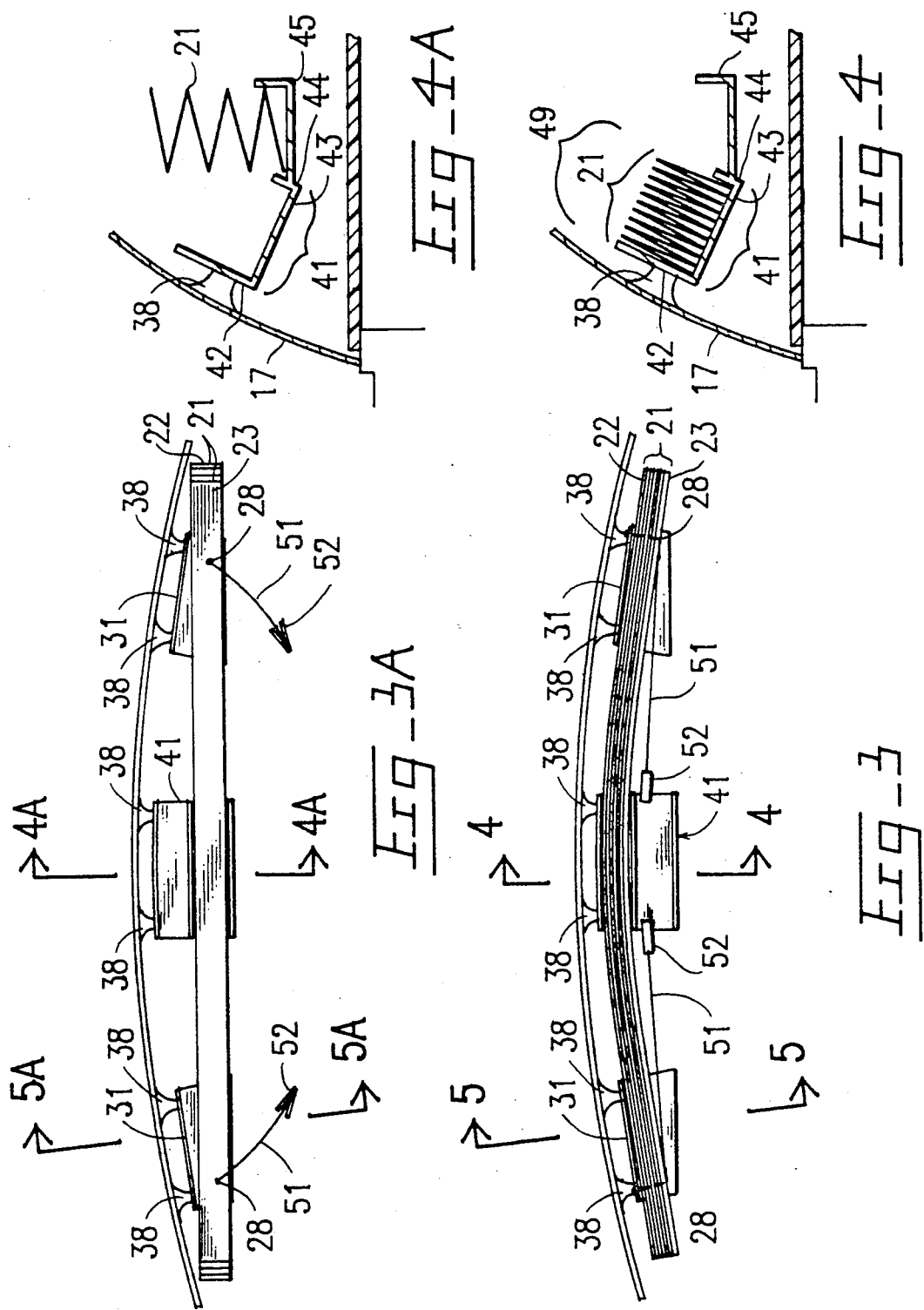

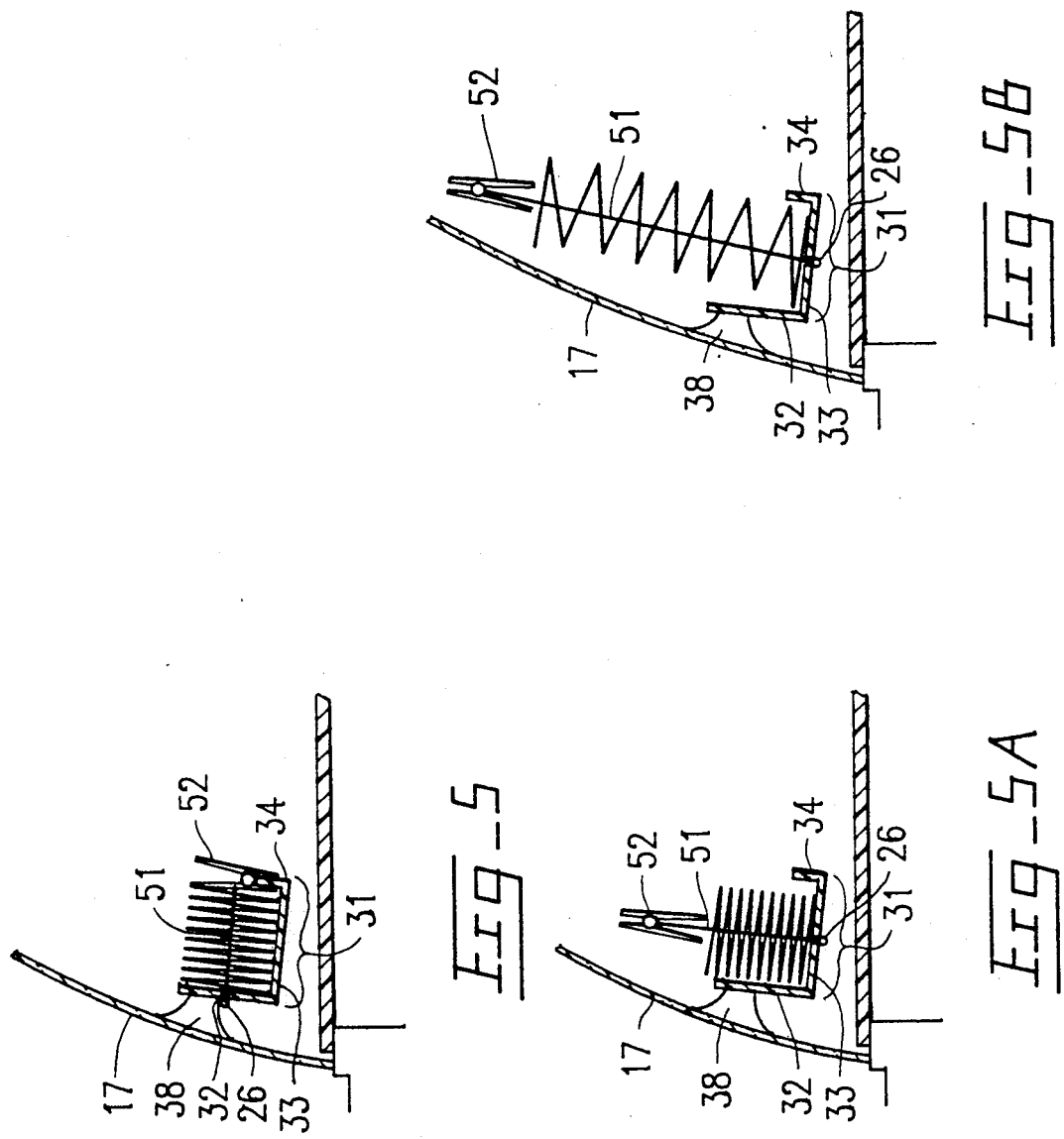

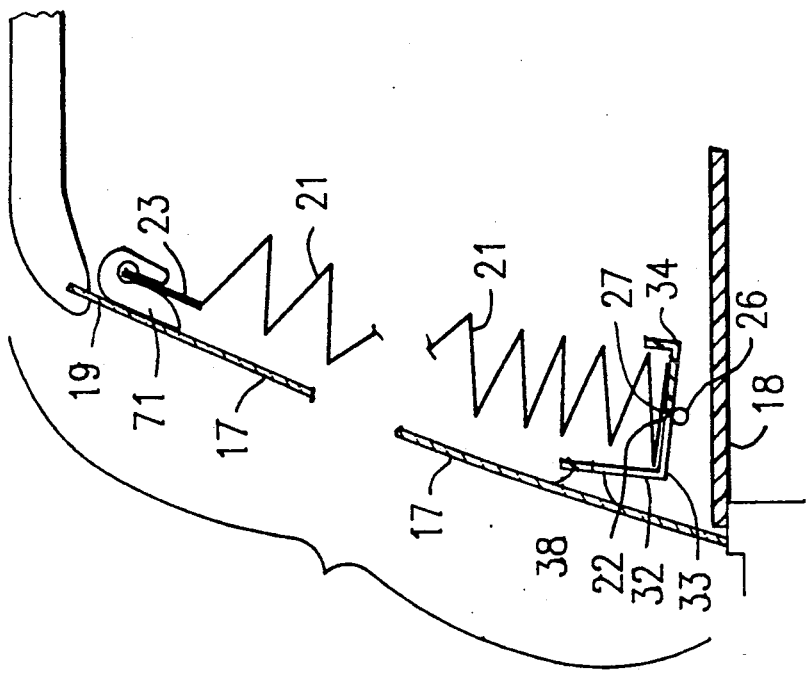
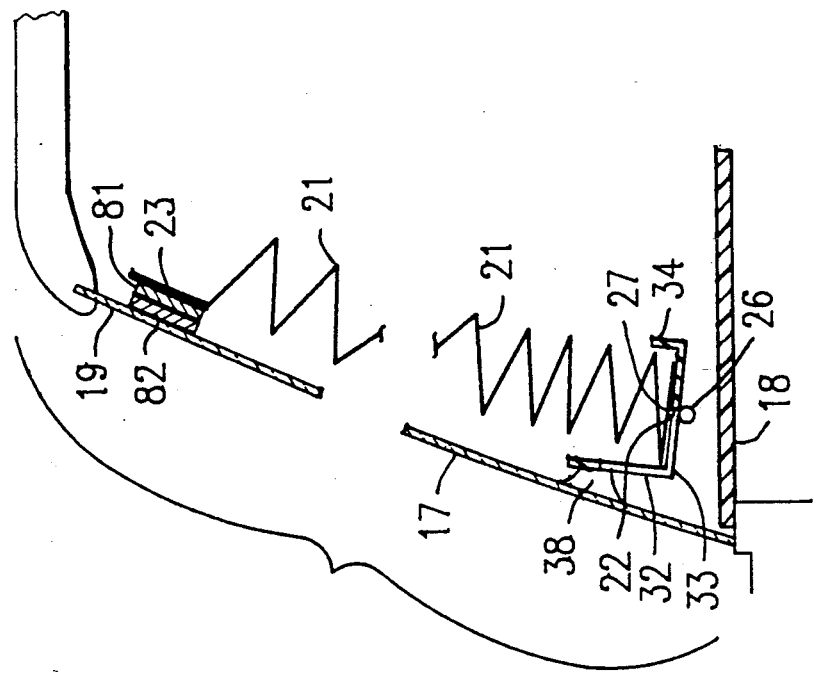

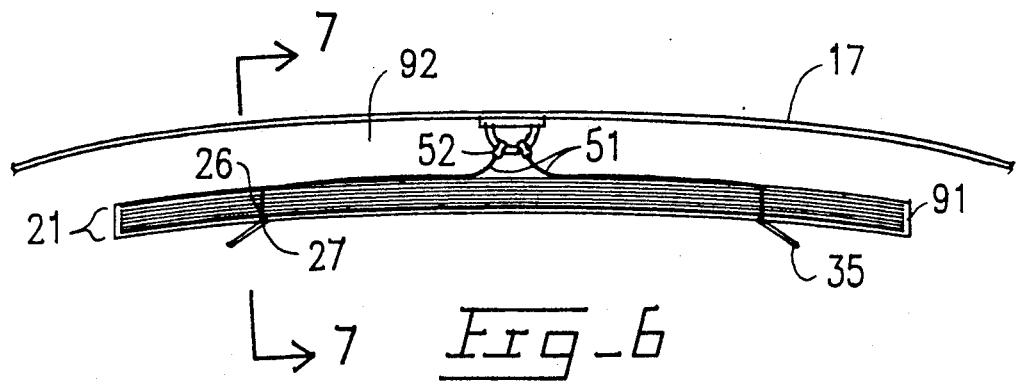
Fig_6
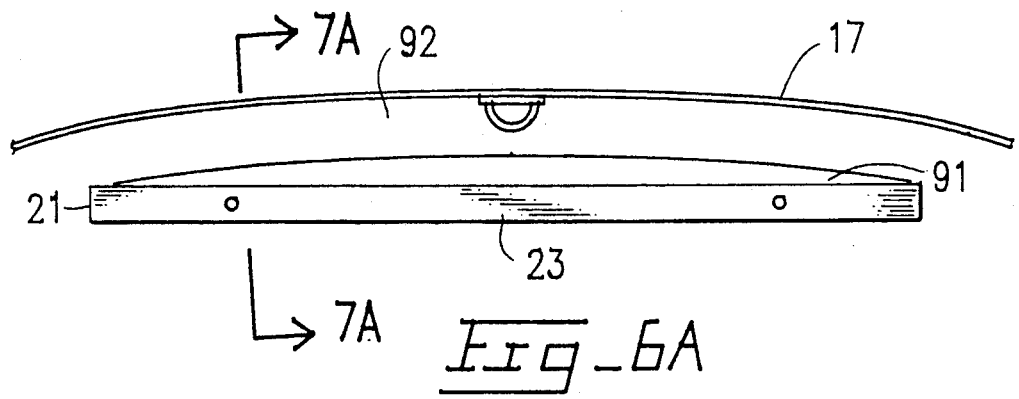
Fig_6A
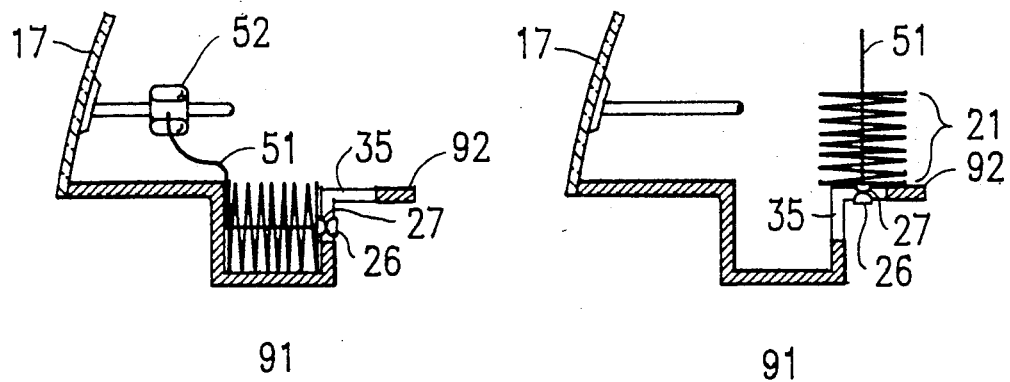
Fig_7    Fig_7A

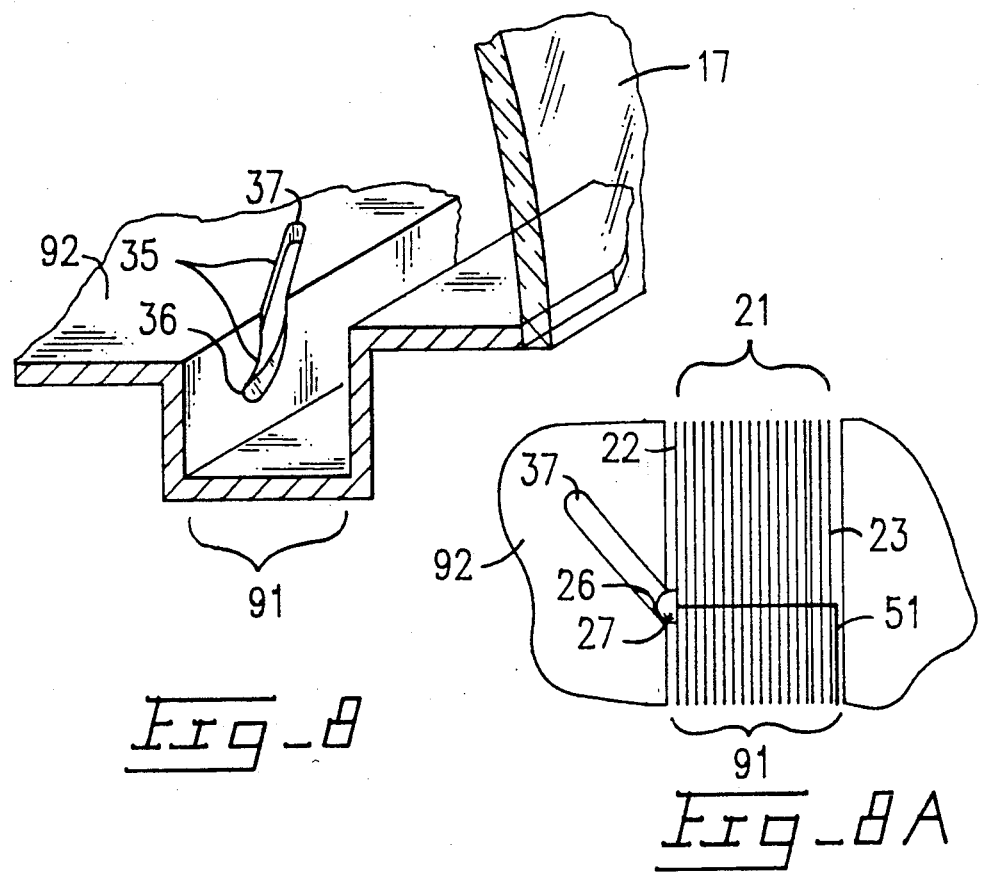
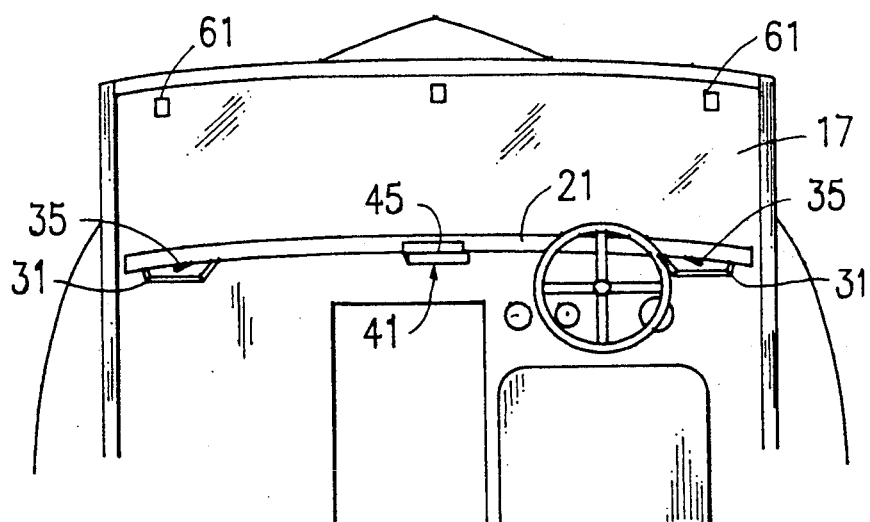

RETRACTABLE HORIZONTAL CONVEYANCE SHADE APPARATUS

BACKGROUND OF THE INVENTION

The invention relates to apparatus useful in shading light, particularly sunlight, from the front interior areas of conveyances or structures which have substantial windshield exposure to the sun's rays. Such conveyances may be automobiles, boats, airplanes, motor homes, or travel vans and pickup trucks.

When automobiles, boats, planes, motor homes or travel trailers are parked outside in the sunlight for an extended period of time, intense heat builds up within the automobile, boat, airplane, motor home or trailer. This is a result of the sun's rays penetrating the glass in concert with the effect of the glass in isolating the interior air of the conveyance from outside air circulation or effective ventilation. Areas of the car receiving direct sunlight particularly collect heat. The upholstery, steering wheel, or dashboard become hot to the touch and vinyl accessories may become weakened to the point of unsightly fading or physical disrepair and deterioration.

Most current automobile windshields, along with those of the other conveyances, are curved across the width of the windshield and are at a slant from the vertical from the front to the rear of the conveyance so as to lessen wind resistance.

A number of devices have been disclosed which provide some measure of relief from this effect. In particular U.S. Pat. No. 4,202,396, issued to Levy, has become quite popular recently. It generally comprises variations of a series of elongated vertical rectangular sections manufactured of some opaque material, such as cardboard, and joined such that they may be horizontally opened to shield the sunlight coming through the front windshield of a car and alternately folded up for storage within the interior of the car. It is adapted with slots to accommodate the rearview mirror and rest when expanded, in a position substantially parallel with the front windshield.

U.S. Pat. No. 4,332,414, issued June 1, 1982, to Surtin is an invention which comprises a fan-like device which, when opened out into a fan, substantially shields the interior of an automobile from sunlight entering the car through the windshield. When the car is to be driven, the "fan" can be closed up out of the way upon the dashboard. It is easy to alternately activate and store it. As the general shape of the fans is radial, there are necessarily gaps in the shielding of sunlight and some still penetrates into the interior of the car.

The windows of permanent structures, particularly homes and offices, are frequently equipped with various forms of blinds, comprising primarily horizontally elongated members which can be alternately tilted to adjust the amount of sunlight allowed within or raised and lowered out of the way altogether. Such blinds are, however, not practical for the personal conveyances referred to above for a number of reasons. First, the space within them is normally limited, particularly in the areas occupied by their operators. Second, the operators of such conveyances must have a clear field of vision which prohibits this sort of bulky appliance from being installed within its confines. The need for personal conveyance having protection from sunlight, however, is even more acute than that of a permanent building or structure as such conveyances normally have a rather high exposure to sunlight through windows to a relatively small interior in comparison with permanent structures or buildings.

What is needed is a shield which will completely block sunlight from coming into the car through the windshield, but which will also be easy alternately open, or activate, and close, or put out of the way. Particularly helpful would be such a shield which could be, in the dormant mode, be permanently stored in a place where its use could be easily facilitated and yet safely and securely out of the way of the operator of the conveyance. Also helpful would be such a shield which would take account of the curvature and slant of the windshield. Such a shield would also be helpful in providing privacy to the occupants of the vehicles or structures.

SUMMARY OF THE INVENTION

The preferred embodiment of the present invention comprises three basic elements. The first basic element is a pleated sheet manufactured of a pliable, substantially opaque, durable material. This material is cut to a size very close to that of an automobile windshield. In alternative embodiments of the invention this sheet may be cut to the size of a boat forward portlight, the windshield of a travel van, pick-up truck, airplane cockpit, or other conveyance which is routinely exposed to the sun's rays. This sheet is further adapted with a series of creases or pleats enabling it to be folded into a bundle. The pleats are aligned to run horizontally across the width of the windshield and the overall sheet may be cut to precisely fit a given windshield.

The second basic element of the preferred embodiment of the preferred invention comprises a mounting apparatus. The mounting apparatus is meant to serve the function of providing a storage area for the pleated sheet when the pleated sheet is folded away for storage. The mounting apparatus also serves the function of anchoring the bottom of the pleated sheet when the pleated sheet is expanded out for windshield coverage. The mounting brackets are further adapted with various platforms and slots in order to facilitate accomplishing both the storage and anchoring functions.

The third basic element of the present invention comprises a means for securing the top of the pleated sheet along the top of the windshield to be covered. While a variety of different apparatus may be used to accomplish this function, each of these apparatus have two primary elements. These include one or more fastening means in order to securely hold the top side of the sheet up near the top of the windshield. The securing means also includes a guiding means in order to ensure that the top side is aligned, oriented, and supported in an effective manner for blocking the sun's rays and to ensure that the sheet may be easily moved both from the folded and stored position to the open position and from the open position back to the folded and stored position.

It is an object of the present invention to provide a windshield shade for use in an automobile, boat, travel trailer, airplane, or other outdoor conveyance.

It is a further object of the present invention to provide such a window shade which will closely fit the outline of such a windshield.

It is a further object of the present invention to provide such a close fitting sunshade which may be conveniently stored near the windshield to be covered while remaining available for quick deployment.

It is a further object of the present invention to provide such a window shade which will accomplish the objectives of effectively blocking the sun's rays and remaining avialable for quick use while in storage and neither detract from the aesthetic appearance of the automobile or other conveyance nor create a safety hazard by either obstructing the operator's crew or by requiring the use of loose or unfastened objects in the passenger compartment of the vehicle.

Other features and advantages of the present invention will be apparent from the following description in which the preferred embodiments have been set forth in conjunction with the accompanying drawings.

BRIEF DESCRIPTION OF THE DRAWINGS

FIGS. 2 and 2A depict a side bracket in which the sheet is folded for storage and rotated for expansion, respectively.

FIGS. 3 and 3A depict the mounting brackets and sheet from above in the storage and rotated for opening positions, respectively.

FIGS. 4 and 4A depict a side view of the center mounting bracket.

FIGS. 5, 5A, and 5B, depict a side view of a side mounting bracket in the various stages of sheet storage and expansion.

FIGS. 5C and 5D depict side views of an expanded sheet which has been adapted with magnetic members (5C) and a slotted clamp (5D) respectively for positioning the upper pleat.

FIGS. 6 and 6A depict the folded pleated sheet stored within the recessed portion of a dashboard and rotated out for opening, respectively from above the dashboard.

FIGS. 7 and 7A depict a cross-sectional view of the folded pleated sheet stored within the recessed portion of the dashboard and rotated out for opening, respectively including a cutout to show the anchoring knob beneath the dashboard.

FIGS. 8 and 8A depict one of the anchoring slots of the recessed portion of the dashboard from an oblique view and from above, respectively.

FIG. 9 depicts a bracket and shade apparatus installed in a boat cabin.

DETAILED DESCRIPTION OF THE PREFERRED EMBODIMENTS

Figure 1:
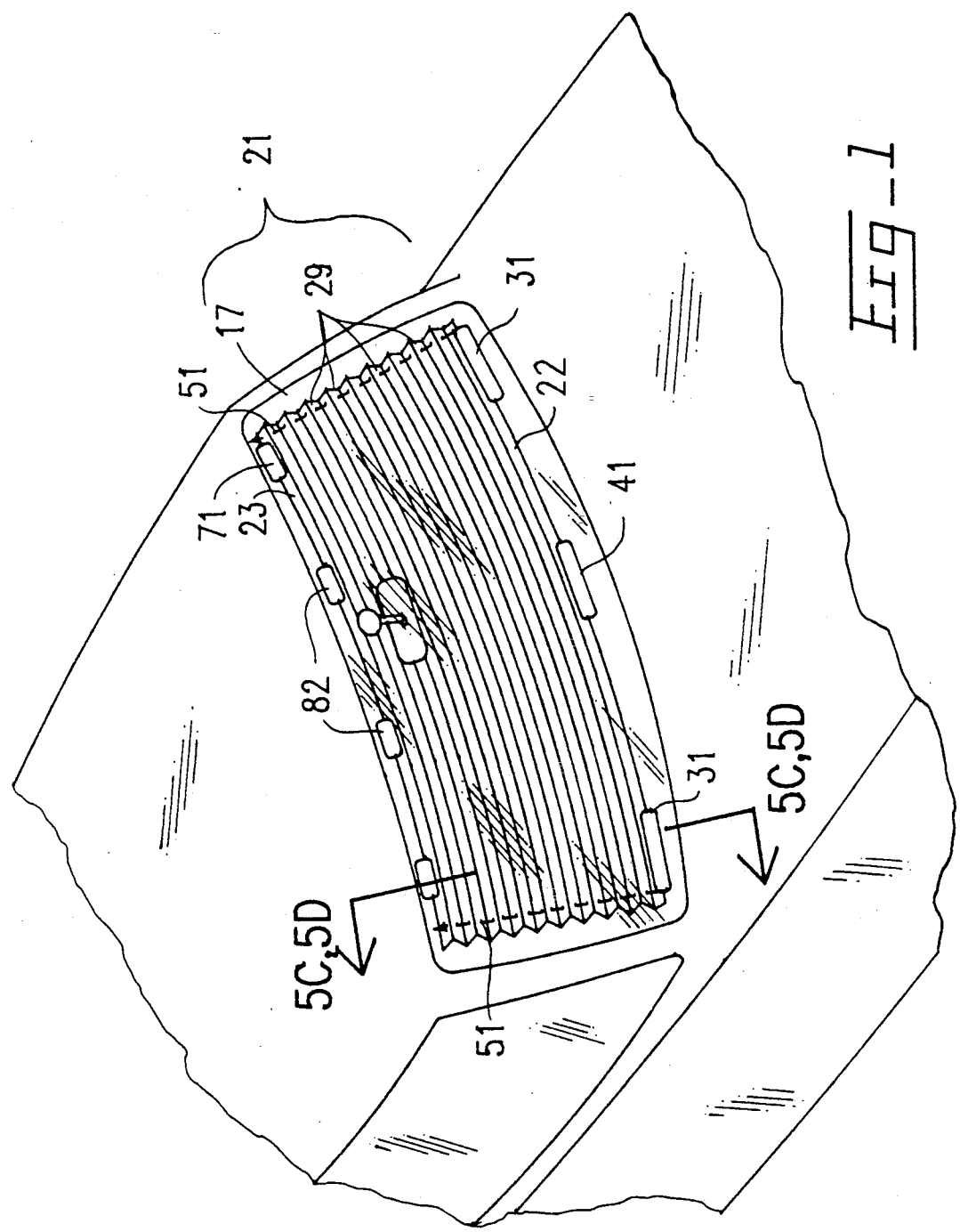
FIG. 1 depicts the preferred embodiment of the invention opened to shade the front portion of an automobile.

In describing the preferred embodiment of the preferred invention reference will first be made to FIG. 1, which is a diagram of a substantially opaque pleated sheet (21) which has been installed in an automobile in a manner so as to block the sun's rays coming through the front windshield (17). FIG. 1 also depicts the mounting brackets (31) (41) and the positioning slots (61). Each of these elements will be developed in more detail in the figures and descriptions to follow. FIG. 1 further depicts that the pleated sheet (21) is aligned with pleats (29) which run generally horizontal, or parallel across the width of the windshield (17). FIG. 1 further depicts two guiding lines (51) which are used to assist in guiding the pleated sheet (21) from its bundled position (not depicted in FIG. 1) to its open position as is depicted in FIG. 1 and subsequently guiding the sheet back to its bundled position. Also depicted in FIG. 1 are positioning slots (61) which are used to position top pleat (23) of the pleated sheet (21) in a manner so as to maximize front windshield (17) coverage. It should be noted that the preferred embodiment of the invention will be described with respect to its use in an automobile windshield (17). The principles and concepts of the invention, together with its primary elements, are equally applicable to its use in a boat, airplane, or travel trailer, or for that matter any form of outdoor conveyance. FIG. 9 depicts the apparatus stored in a boat.

The pleated sheet (21) further comprises a top pleat (23) and a bottom pleat (22) which are made more rigid than the remaining pleats (29). This is because the top pleat (23) and bottom pleat (22) are required to provide stability to the sheet apparatus in both the open and folded positions. The pleated sheet (21) is also adapted with a series of holes (28) near each side which run from the top pleat (23) to the bottom pleat (22) at the center of each pleat (29) so that, when folded, each series of holes (28) line up to make an uninterrupted path through the bundle of folded pleats (21) and, when opened, each series of holes (28) makes a straight line (81) from the bottom pleat (22) to the top pleat (23).

Making reference to FIGS. 2 and 2A, it can be seen that the bottom pleat (22) of the pleated sheet (21) is adapted with an anchoring arrangement which comprises of a two-part anchoring apparatus, which includes a joining member (27) which is securely fastened to the bottom pleat (22) of the pleated sheet (21) and an anchoring knob (26). The significance of this anchoring mechanism (26, 27, and 35) will be described later.

Having described the pleated shading sheet (21), reference is again made to FIG. 1, and attention will now be given to the mounting apparatus, which typically comprises a center mounting bracket (41) and two side mounting brackets (31) that must serve to hold the pleated sheet (21) when folded in storage and to anchor the bottom pleat (22) of the pleated sheet (21) when expanded out to block out the rays of the sun. This presents a unique problem in that the folded bundle is curved or arced in the closed position, (see FIG. 3) but when opened (FIG. 1) it is substantially planar. Because of this unique problem, each of the mounting brackets (31, 41) are made to accommodate the various positions of the pleated sheet (21). Each mounting bracket (31), (41) is adapted with a means (38) of fastening it to the windshield (17) which may simply comprise arms (38) glued from the windshield (17) to the brackets (31, 41).

Making reference to FIG. 4, the center bracket (41) is shown to have a storage area (49) defined by a front side (42), a bottom side (43) and a back side (44). The back center bracket side (44) is generally shorter then the front bracket side (42) and may be further adapted with a rear platform (45) extending out behind the center back bracket side (44). The folded pleated sheet (21) may then be stored within the storage area (49) when folded or rotated out to rest on the rear platform (45) for opening. If the conveyance is equipped with a dashboard (18) or other satisfactory flat surface along the bottom edge of the windshield, no rear platform (45) is necessary as is the dashboard's flat surface will serve this function.

The pleated sheet (21) is also equipped with two guiding lines (51) which are adapted to both guide the pleated sheet (21) from the folded to the open position and when returning it to the folded position.

As can be seen by making reference to FIGS. 3 and 3A and because the pleated sheet (21) must be secured in the closed position, the side brackets (31) are made in the general shape of a wedge. In this manner the front sides (32) of the side mounting brackets (31) will position the folded sheet (21) in an arc against all of the front bracket sides (32, 42) for storage. The wedge shaped bottom lower bracket side (33, 43) will permit the sheet to rotate from the storage position and be opened out in a generally flat and planar manner. Additionally these side mounting brackets (31) and the pleated sheet (21) are adapted with means to anchor the pleated sheet (21) in both the folded storage and opened positions.

The anchoring means joining members (27), as have been described, are securely fixed to the bottom pleat (22). The side brackets (31) are further adapted with a slot (35) which has a width (71) sufficient to accept the top half of the anchor joining member (27) on the bottom pleat (22) but not the anchor knob (28). These slots (35) are positioned so as to run from a point (36) on the front side of the bracket in a diagonal manner out to a point (37) on the lower bracket side (33).

The anchor joining members (27) on the bottom pleat (22) thus used to secure the pleated sheet (21) in the folded position (FIG. 5) as follows. The anchor joining members (27) are positioned through the slots (35) and (27) are attached to the anchor knob-member (26). This keeps the pleated sheet (21) anchored to the side brackets (31) but free to slide along the slots (35). Accordingly, the folded sheet (21) can be rotated from the stored position (FIGS. 3, 4 and 5) into the straight line configuration required for opening (FIGS. 3A, 4A, and 5A). FIG. 5B depicts the sheet (21) being expanded.

It is now appropriate to discuss the fastening and positioning means used to secure the sheet (21) in the open position. With the folded sheet (21) rotated out so that the lower pleat (22) rests on the bottom bracket sides (33) the guiding lines (51) may be pulled straight up to points (71) at or near the top of the windshield.

The upper end of the guiding lines are adapted with a spring-loaded clips (52) which may, but need not, resemble a clothespin which can be hooked to a bar (53) or other receiving apparatus at points (18) near the top side (19) of the windshield directly above the bottom bracket slot end (37).

Positioning grooved clamps (71) may then be used to hold the upper pleat (23) of the sheet (21) in position along the top edge of the windshield. The positioning grooved clamps (71) should have one open end to receive the upper pleat of the sheet and the groove should be sufficiently narrow so as to hold the upper pleat (23) securely within. In order to ensure maximum and close coverage of the top side of the windshield (19), the positioning grooved clamps (72) may be optionally augmented with other fastening means as described below.

As depicted in FIG. 1, several magnetic members (81) may be fastened to the upper pleat (23) corresponding metallic members (82) may be placed along the top of the windshield (19) in order to receive the upper pleat (23) magnetic members (81). Of course, the magnetic members (81) could be placed along the topside of the windsheild (19) and metallic members (82) fastened upon the upper pleat (23) if desired. Additionally, other forms of adhesion could be used, such as adhesive fabrics such as VELCRO (®) strips, small hooks, or other simple and discrete means of securing the upper pleat (23) of the sheet (21) along the top side (19) of the windshield (17).

Referring now to FIGS. 6 through 8, the principles and method of operation described can be fully applied to a version of the sun shade which may be stored within a recessed portion (91) of an automobile dashboard (92). Such a recessed portion (91) would be curved along the bottom of the windshield (16) in order to hold the pleated sheet (21) when bundled and then permit the bundled pleated sheet (21) to be rotated out to rest upon the dashboard (92) for opening.

The same sort of anchoring apparatus may be used to accomplish this result, particularly referring to the anchoring slots (35) and the anchoring members (26, 27). Since there are no mounting brackets, as described above, the anchoring slots (35) are positioned from beginning points (36) within the recessed area (91) out to ending points (37) on the surface of the dashboard (92).

Accordingly, the bundled pleated sheet (21) may be rotated from storage within the dashboard recessed portion (91) out to rest upon the dashboard surface (92) and then be opened and closed just as in the mounting bracket version.

It should be noted that the bottom pleat (22) stored in the recessed dashboard portion (91) rests so that it is facing away from the windshield (17) of the conveyance, whereas in the mounting bracket version the bottom pleat (22), when stored, rested against the front bracket sides (32) and faced towards the windshield (17).

Modification and variation can be made to the disclosed embodiments without departing from the subject and spirit of the invention as defined in the following claims. For instance, the guiding lines could be made of an elastic material to enhance this performance. Such modifications and variations, as included within the scope of these claims, are meant to be considered part of the invention as described.

What is claimed is:

1. A sun shade apparatus for shading a forward enclosed area of a conveyance, such as an automobile, boat, pickup truck, airplane, or travel van, from light entering through a front windshield of such conveyance, the apparatus comprising:

a sun shade, comprising a substantially opaque pleated sheet, said pleated sheet further comprising pleats of uniform width and oriented transversely with respect to a longitudinal axis of said conveyance, and further permitting said sheet to be selectively folded into a compact bundle of pleats of said sheet and to be unfolded to substantially block light coming through said windshield;

said sheet further comprising a bottom pleat and a top pleat, each of which are of adequate extra rigidity to provide stability to a shape of the overall sheet when either folded into said compact bundle or unfolded to block the light coming through said windshield;

a storage and mounting means, said storage and mounting means comprising two side mounting brackets and one center mounting bracket, said side mounting brackets being located and fixed upon a point near an interior bottom of said windshield near either side of said windshield and said center bracket being located and fixed upon a point near the interior bottom of said windshield at a center of said windshield;

each said side bracket comprising a front side, a plane of which is substantially parallel with a plane of said windshield and which is fastened to and separated from said windshield by an adhesive mounting member, and a bottom side, each said bottom side further comprising a front edge which is attached to a bottom edge of said front side, and a resting surface, said resting surface extending out from said front side in a plane substantially perpendicular to the force of gravity a distance sufficient to permit said compact bundle of pleats to rest thereon;

said center bracket further comprising a front side, a plane of which is substantially parallel to the plane of said windshield and which is fastened to and separated from said windshield by an adhesive mounting member, and a bottom side, said bottom side further comprising a front edge which is attached to a bottom edge of said center bracket front side, and a resting surface, said resting surface extending out from said center bracket front side in a plane substantially perpendicular to the force of gravity a distance sufficient to permit said compact bundle of pleats to rest thereon, and a rear side, said rear side having a bottom edge attached to a rear edge of said center bracket resting surface and extending a short distance up from said center bracket resting surface;

each said side bracket including a slotted path, said slotted path running diagonally from an upper point on each said side bracket front side away from the center of said windshield through each said side bracket front side bottom edge to a lower point on each said side bracket bottom side;

two bottom pleat anchoring means each comprising a joining member attached to said bottom pleat and adapted to freely pass through each respective side bracket slotted path, each said joining member further including an anchoring member which is adapted to slide along an exterior surface of each said slotted path but not pass through said slotted path; and fastening means comprising at least one means for releasably securing said top pleat along a top of said windshield.

2. The apparatus of claim 1 wherein said center bracket further includes a rear platform, said rear platform extending out from said rear side in a plane substantially perpendicular to the force of gravity.

3. The invention described in claim 2 in which said fastening means further comprises two guiding lines each having one end fixed to said bottom pleat at points adjacent to said joining members and running through a series of holes in said pleats, each said series of holes being positioned halfway across the width of each pleat in a line from each joining member of said bottom pleat to each fastening means at said top pleat and being further adapted to permit one of said guiding lines to pass through each hole in said series of holes from said bottom pleat to said top pleat when said sheet is either opened out or folded into said compact bundle, and the other ends of said guiding lines including a hanging means;

two receiving means, each said receiving means being fastened to points along the top of said windshield vertically above said side bracket slotted path and further adapted to receive each said hanging means; and positioning means, said positioning means further comprising two or more slotted clamps positioned along the top of said windshield to receive said top pleat.

4. The invention described in claim 1 wherein said fastening means further comprises two guiding lines each having one end fixed to said bottom pleat at points opposite said joining members and each running through a series of holes in said pleats, each said series of holes being positioned halfway across the width of each pleat in a line from each joining member of said bottom pleat to each fastening means at said top pleat and being further adapted to permit one of said guiding lines to pass through each hole in said series of holes from said bottom pleat to said top pleat when said sheet is either opened out or folded into said compact bundle, and the other ends of said guiding lines including a hanging means;

two receiving means, each said receiving means being fastened to points along the top of said windshield vertically above said side bracket slotted path and further adapted to receive each said hanging means; and positioning means, said positioning means further comprising two or more grooved clamps positioned along the top of said windshield adapted to receive said top pleat.

5. A sun shade apparatus for shading a forward enclosed area of a conveyance, such as an automobile, boat, pickup truck, airplane, or travel van, from light entering through a front windshield of such conveyance, the apparatus comprising:

a pleated sheet, said pleated sheet being made of a substantially opaque material and having dimensions corresponding to the windshield of said conveyance, said pleated sheet further adapted with horizontal pleats with equal widths such that said sheet may be folded into a compact bundle and further adapted with top and bottom pleats each of which are of adequate extra rigidity to provide stability to a shape of the overall sheet when either folded into said compact bundle or opened out to block the light coming through said windshield;

an anchoring means, said anchoring means further comprising two anchoring members fastened to said bottom pleats and anchoring slots fixed along a bottom side of said windshield at points near sides thereof, said anchoring member each adapted with knobs joined to said bottom pleat with joining members such that said joining members fit through and slide along said slots while said knobs remain opposite said slots from said bottom pleat, said slots further positioned to permit said compact bundle to be anchored in a storage position when folded and then moved through said slots to a convenient position for opening;

said pleated sheet being further adapted with a guiding means, said guiding means further comprising a series of holes running through each pleat from points above each said anchoring member up through said top pleat, said holes being adapted to accept a guiding line, said guiding line running from each said anchoring member at said bottom pleat, through each said other pleat and to a point near a top side of said windshield wherein said guiding means further comprises a holding apparatus, said holding apparatus further comprising a hanging member on the opposite end of said guiding line and a receiving member fastened to said top windshield point to accept said hanging member; and positioning means along the top of said windshield, said positioning means further comprising one or more grooved members adapted to snugly receive said top pleat.

6. The invention described in claim 5, in which said positioning means further comprises at least one pair of magnetic fastening members, each pair being of opposite polarity such that a first member is fastened to a point along the top of said windshield and a second member is fastened to a corresponding point along the top pleat.

7. A sun shade apparatus for shading a forward enclosed area of a conveyance, such as an automobile, boat, pickup truck, airplane, or travel van, from light entering through a front windshield of such a conveyance which is further equipped with a dashboard immediately beneath said windshield, the apparatus comprising:

a pleated sheet, said pleated sheet being made of a substantially opaque material and having dimensions corresponding to the windshield of said conveyance, said pleated sheet including horizontal pleats with equal widths such that said sheet may be folded into a compact bundle and further including top and bottom pleats each of which are of adequate extra rigidity to provide stability to a shape of the overall sheet when either folded into said compact bundle or opened out to block the light coming through said windshield;

a storage and anchoring means, said storage and anchoring means further comprising an elongated, recessed portion along a bottom side of said windshield within the dashboard of said conveyance, said elongated portion further comprising a slot near each end extending from points within said recessed portion to points upon said dashboard, each said slot further having a preselected width to permit a joining member joining said bottom pleat to an anchoring knob to pass therethrough and slide along said slots, each said anchoring knob being too large to pass through said slots, said slots being further positioned to selectively anchor said compact bundle within said recessed portion and to permit said compact bundle to be rotated out and rest upon said dashboard for expansion;

said pleated sheet further including a guiding means, said guiding means further comprising a series of holes extending through each pleat from points above each said anchoring member to said top pleat, said holes being adapted to accept a guiding line, said guiding line running from each said anchoring member at a first end, through each said pleat and to a point near the top of said windshield wherein said guiding means further comprises a holding apparatus, said holding apparatus further comprising a hanging member on a second end of said guiding line and a receiving member fastened to said top windshield point to accept said hanging member; and positioning means along the top of said windshield, said positioning means comprising one or more grooved members adapted to snugly receive said top pleat.

8. The invention described in claim 7, wherein said positioning means further comprises at least one pair of magnetic fastening members of opposite polarity, so that a first magnetic fastening member of said pair of magnetic fastening members is fastened to a point along the top of said windshield and a second magnetic fastening member of said pair of magnetic fastening members being fastened to a corresponding point along said top pleat.

* * * * *